United States Patent [19]

Paulson

[11] 4,210,866

[45] Jul. 1, 1980

[54] LINEARIZING CIRCUIT FOR A NON-DESTRUCTIVE TESTING INSTRUMENT HAVING A DIGITAL DISPLAY

[75] Inventor: Thomas E. Paulson, Glenview, Ill.

[73] Assignee: Magnaflux Corporation, Chicago, Ill.

[21] Appl. No.: 903,872

[22] Filed: May 8, 1978

[51] Int. Cl.[2] .......... G01R 33/12

[52] U.S. Cl. .......... 324/222; 324/225; 324/132

[58] Field of Search .......... 324/132, 222, 225; 364/573, 852; 328/162

[56] References Cited

U.S. PATENT DOCUMENTS

| | | | |
|---|---|---|---|
| 3,244,977 | 4/1966 | Folsom | 324/132 |
| 3,549,998 | 12/1970 | Fluegel | 324/132 |
| 4,074,186 | 2/1978 | Flaherty | 324/222 |

*Primary Examiner*—Rudolph V. Rolinec

*Attorney, Agent, or Firm*—Neuman, Williams, Anderson & Olson

[57] ABSTRACT

A linearizing circuit is provided for a non-destructive testing instrument having circuit means developing a DC voltage having a non-linear relationship to units of measurement or of conductivity or some other characteristic measure. A plurality of linearizing stages are provided each including an adjustable resistance connected between a reference voltage source and an output line when the potential of the output line is between the reference voltage and one limit of the DC voltage. Preferably, an analog switch is provided in series with the adjustable resistance and is controlled from an operational amplifier, with a second operational amplifier being provided having an output connected through the analog switch and the adjustable resistance to the output line. The circuit is very accurate and reliable and is readily adjusted by a method wherein the resistances are adjusted in accordance with reference voltages in a certain sequence to obtain accurate adjustment with no juggling operation.

5 Claims, 2 Drawing Figures

OSC. CIR.
AMP & DRIVER CIRCUIT
BRIDGE CIRCUIT
AC AMP.
ZERO CROSSING DET.
ANGLE DET.
PHASE SHIFTER
+5V.
-5V.
INTE-GRATOR CIR.
DIGITAL VOLTMETER CIRCUIT
DC AMP.
DC AMP.
LINEARIZING CIRCUIT
SW.

90
91
92
93
94
95
96
97
98
100
109
118
110
119
111
88
120
121
122
112
123
124
125
113
114
87
VOLTAGE
115
116
101
102
103
104
105
106
107
108
99
89
CONDUCTIVITY

LINEARIZING CIRCUIT FOR A NON-DESTRUCTIVE TESTING INSTRUMENT HAVING A DIGITAL DISPLAY

This invention relates to a linearizing circuit for a non-destructive testing instrument having a digital display. The circuit is comparatively simple in construction and operation, is readily adjusted and provides very accurate measurements with a high degree of reliability.

BACKGROUND OF THE PRIOR ART

Non-destructive testing instruments are frequently designed to measure physical characteristics of an object in certain units which have been established according to certain standards. For example, electrical conductivity of a test part may be measured as a percentage of the conductivity of a certain standard specimen structure, permeability may be measured as a ratio to the permeability of air and length dimensions such as the thickness of a layer, for example, may be measured in conventional units of length.

Most non-destructive testing instruments have heretofore used meters with a movable pointer or the like. If in such instruments a signal is produced which does not have a linear relationship to the units being measured, the scale of the meter can be appropriately calibrated to compensate. There are certain problems in the use of meters, however, and as disclosed in John J. Flaherty U.S. Pat. No. 4,074,186, issued Feb. 14, 1978, such problems as are related to conductivity testing might be avoided by use of a digital read-out arrangement, provided that an analog voltage is developed as a linear function of conductivity.

The arrangements as disclosed in said patent constitute an important break-through in the measurement of conductivity but have limitations. Linearization circuits as disclosed are subject to inaccuracies or are quite complicated and expensive. A linearization circuit such as disclosed in FIG. 3 of the patent, which uses diodes, is satisfactory for many applications but where an extremely high degree of accuracy is desired, the characteristics of the diodes may preclude the attainment of the desired results. A circuit such as shown in FIG. 4 of the patent involving the use of an analog-to-digital converter, a read-only memory and a digital-to-analog converter can provide a very high degree of accuracy but has disadvantages in that the programming might have to be altered for different instruments or different probes and it would be impractical and expensive to individually program a read-only memory for each instrument.

Attempts have also been made to use a circuit according to FIG. 3 of the aforesaid Flaherty patent but using transistors in place of diodes but it was found that there are severe problems because the transistor base-to-emitter voltage current is not a linear function of collector current.

SUMMARY OF THE INVENTION

This invention was evolved with the general object of overcoming the disadvantages of prior art arrangements and of providing a non-destructive testing instrument with a digital read-out and with linearization means such that a high degree of accuracy can be obtained.

Another object of the invention is to provide a circuit which can obtain a very high degree of accuracy while being relatively simple and inexpensive in construction and operation.

A further object of the invention is to provide an instrument which can readily be adjusted to obtain a very high degree of accuracy.

In accordance with this invention, a linearizing circuit is provided for a non-destructive testing instrument which includes probe means arranged to be placed in proximity to structure to be tested and circuit means for developing a DC voltage corresponding to a physical characteristic of the part with there being a non-linear relationship between the DC voltage and units of measurement of the characteristic. The instrument further includes a digital voltmeter circuit for producing a digital indication accurately corresponding in a linear fashion to the magnitude of an input signal applied thereto. The linearizing circuit comprises a plurality of reference voltage sources for establishing a plurality of reference voltage levels lying between the lower and upper limits of the DC voltage which corresponds to a physical characteristic of the part. The reference voltage sources are preferably adjustable and most preferably they comprise a plurality of potentiometers connected to inputs of a plurality of operational amplifiers with reference voltage levels being developed at the outputs of the operational amplifiers.

The linearizing circuit further includes a plurality of resistance means and a plurality of analog switch devices connected in series between an output line and reference voltage points, which as above indicated, may be preferably provided at the outputs of operational amplifiers. The output line is connected through an additional resistance means to the input voltage from the probe circuit. Means are provided for operating the analog switches in response to differences between the output voltage level and the respective reference voltage levels. Preferably, operational amplifiers are provided for controlling the analog switches. With the combination of the operational amplifiers and the analog switches, it is possible to very accurately control the switching in accordance with the comparison of the output voltage and the reference voltage levels and to obtain a very low resistance in series with the resistance means. There are no non-linear circuit elements which enter into the operation of the circuit and an extremely accurate operation is obtained, largely independent of variations in temperature and other ambient conditions.

The circuit has an important additional advantage in that it is readily adjustable and an important feature relates to a method of adjusting the circuit to accurately compensate for the non-linearities in the voltage produced by the probe circuit.

In the operation of the circuit, none of the analog switches are conductive when the input voltage is between one limit thereof and the first reference voltage adjaent thereto and at least that reference voltage and generally all of the reference voltages may be initially adjusted after determining the form of the non-linear input voltage to the linearizing circuit. After so adjusting at least the first reference voltage of the first stage, the resistance of the first stage is adjusted in accordance with the reference voltage of the second stage to produce an output voltage equal to the second reference voltage when the appropriate input voltage is applied. Next, the resistance of the second stage is adjusted in accordance with the reference voltage of the third stage. This operation is continued until all stages are adjusted and by working in this sequence, an accurate adjustment is obtained. The procedure avoids "juggling" operations which are required when other adjustment procedures are followed.

This invention contemplates other objects, features and advantages which will become more fully apparent from the following detailed description taken in conjunction with the accompanying drawing.

DESCRIPTION OF A PREFERRED EMBODIMENT

Figure 1:
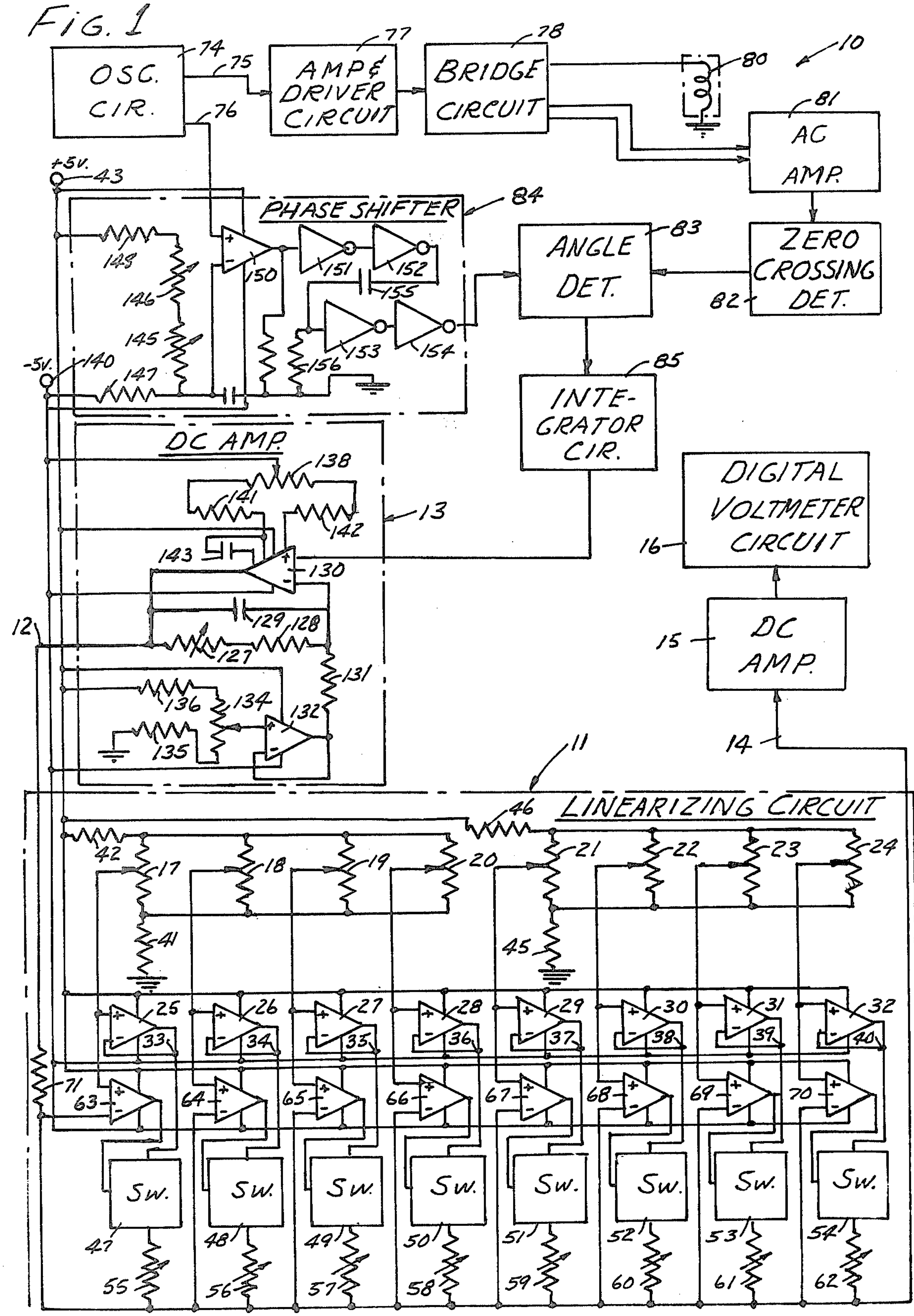
FIG. 1 is a schematic diagram of a conductivity measuring instrument incorporating a linearizing circuit in accordance with the invention.

Reference numeral 10 generally designates a conductivity measuring instrument which incorporates a linearizing circuit 11 in accordance with the principles of the invention. The instrument 10 includes circuitry as hereinafter described which develops a DC output voltage on a line 12, at the output of a DC amplifier 13, such voltage being a non-linear function of a physical characteristic of a part, in this case the voltage being a non-linear function of the conductivity of a part. The voltage on line 12 is applied to the input of the linearizing circuit 11 which develops on an output line 14 a voltage which is linearly proportional to the conductivity of the part. The linearized voltage so developed is applied through a DC amplifier 15 to a digital voltmeter circuit 16 which develops a digital indication and may, for example, include light-emitting diode displays.

The linearizing circuit 11 comprises a plurality of reference voltage sources, eight reference voltage sources being used in the illustrated embodiment. Each of the reference voltage sources is preferably adjustable with an adjustable potentiometer being provided for this purpose and each preferably includes an operational amplifier for providing a very low output impedance and for developing an output voltage which is maintained at the value set by the potentiometer, independent of loading. In the illustrated embodiment, there are eight potentiometers 17–24 having movable contacts connected to the positive inputs of eight operational amplifiers 25–32 with minus inputs of the amplifiers 25–32 being connected to output terminals thereof, connected to circuit points 33–40 at which the reference voltages are developed. The potentiometers 17–20 are connected in parallel with each other and in series with resistors 41 and 42 between ground and a voltage supply terminal 43. Similarly, the potentiometers 21–24 are connected in parallel with each other and in series with resistors 45 and 46 between ground and the supply voltage terminal 43.

The linearizing circuit 11 further includes eight analog switches 47–54 which have terminals connected to the reference voltage circuit points 33–40 and which have additional terminals connected through adjustable resistors 55–62 to the output line 14. Control terminals of the analog switches 47–54 are connected to the outputs of eight operational amplifiers 63–70 which have plus inputs connected to the adjustable contacts of the potentiometers 17–24 and which have negative inputs connected together and to the output line 14. Finally, the linearizing circuit includes a resistor 71 between the output line 14 and the input line 12 which is connected to the output of the DC amplifier 13.

The operation of the linearizing circuit will be described in detail after first describing the operation of the instrument and the form of the DC voltage developed at the DC output of the DC amplifier 13. In brief, the analog switches are all closed when the input voltage is at its lower limit and as the input voltage increases the analog switches are progressively opened to cut off current flow through the respective resistors and to allow the output voltage to move toward the respective reference voltage levels and to produce a substantially linear relationship between the output voltage and conductivity.

To develop a signal corresponding to the conductivity of a part, the instrument 10 includes an oscillator circuit 74 which develops a sine wave signal on a output line 75 and a triangularly shaped output signal on an output line 76. The sine wave output line 75 is connected to the input of an amplifier and driver circuit 77 which has an output connected to a bridge circuit 78 connected to a probe coil 80 which is arranged to be placed in proximity to a part being tested. The bridge circuit 78 develops two output signals which are applied to inputs of an AC amplifier 81, one signal being varied as a function of the conductivity of the part and the other being a balance signal. The output of the AC amplifier 81 is connected to an input of a zero crossing detector circuit 82 which has an output connected to one input of an angle detector circuit 83. A second input of the angle detector circuit 83 is connected to the output of a phase shifter circuit 84 which has an input connected to the triangle wave output line 76 of the oscillator circuit 74.

The output of the angle detector circuit 83 is connected through an integrator circuit 85 to the input of the DC amplifier circuit 13.

With appropriate adjustment, the circuit develops a signal at the output of the DC amplifier 13 which accurately corresponds to the conductivity of a part but which is nonlinear. The use of the angle detector circuit 83, which is sensitive to the phase angle difference between the signal from the output of the zero crossing of the detector 82 and the reference signal from the phase shifter circuit 84 is advantageous because is provides a very good "lift-off" discrimination, i.e. it is insensitive to small changes in the distance between a probe and the surface of the part while having a uniform and sensitive response to changes in conductivity. Also, the signal is a single-valued function of conductivity, changing progressively and continuously in one direction in response to changes in conductivity of the part under test from one end to the other of a wide range of conductivity values. This is important in permitting operation of the linearizing circuit in a manner such as to obtain highly accurate operation.

Figure 2:
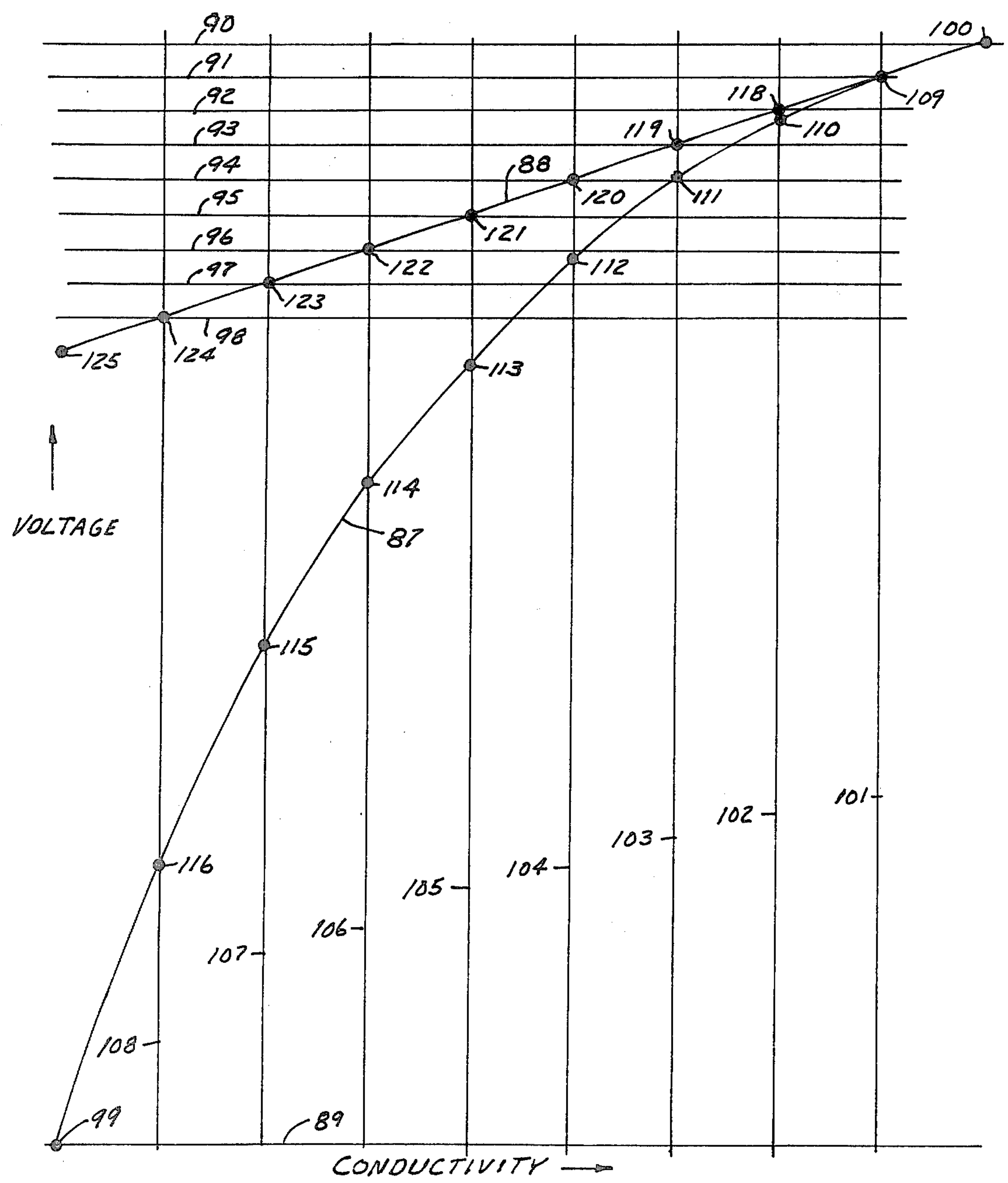
FIG. 2 is a graph illustrating the relationship of voltages at certain points of the circuit and illustrating the operation of the circuit and the manner of adjustment thereof.

In the graph of FIG. 2, the line 87 indicates the relationship between the output voltage of the DC amplifier 13 and the percent conductivity of a part under test, voltage being the ordinate and conductivtiy being the abscissa and both being on linear scales. The line 87 is a curved line illustrating the non-linear relationship and has a slope which decreases as the conductivity is changed from a low value to a high value. Line 88 shows the relationship between the output voltage of the linearizing circuit 11 and is very nearly a straight line, there being only slight variations from an exactly linear relationship as hereinafter discussed.

Horizontal line 89 indicates the lower limit of the applied input voltage to the linearizing circuit and line 90 indicates the upper limit. Horizontal lines 91–98 indicate the reference voltage levels which are established by the potentiometers 17–24, respectively. Points 99 and 100 on curve 87 correpond to operation at low and high conductivities, corresponding to the lower and upper voltage limit lines 89 and 90. Vertical lines 101–108 indicate intermediate conductivity values. Vertical line 101 intersects both the input voltage line 87 and the output voltage line 88 and also the reference voltage line 91 at a point 109. The vertical lines 102–108 intersect line 87 at points 110–116 and intersect the output line 88 and also the reference voltage lines 92–98 at points 118–124. Point 125 on output line 88 is in line with points 100, 109 and 118–124 thereof and is in vertical alignment with point 99 on the input line 87, at the lower limit.

In operation, when the conductivity is low and the input voltage is at its lower limit as indicated by point 99 on curve 87, the output voltage on line 14, applied to the minus inputs of all of the operational amplifiers 63–70 is below the reference voltage levels set by all of the potentiometers 17–24 and applied to the plus inputs of the operational amplifiers 63–70. Under such conditions, the analog switches 47–54 are all closed and there is current flow from all of the outputs of the operational amplifiers 25–32 and through the resistors 55–62 to the output line 14. There is a relatively large current flow through, and voltage drop across, the resistor 71 and the output voltage is, in effect, pulled up to a value which is less than but relatively close to the lowest reference voltage indicated by line 98.

As the input voltage is increased above its lower limit, the output voltage increases in direct proportion as determined by current flow through all of the resistors 55–62. When the input voltage is increased to a value as indicated by point 116 on line 87, the output voltage rises to the reference level 98 at point 124, at which time the voltages at the minus and plus inputs of operational amplifier 70 are equal and the analog switch 54 is opened to cut off current flow through the resistor 62. As the input voltage increases further, the output voltage increases in direct proportion as determined by current flow through resistors 55–61. When the input voltage increases to a value as indicated by point 115 on line 87, analog switch 53 is opened to cut off current flow through resistor 61, the output voltage being thereafter determined by current flow through resistors 55–60. This operation is continued until the output voltage rises to the uppermost reference voltage level 91, at point 109 in FIG. 2. The potentials of the plus and minus inputs of operational amplifier 63 are then equal and the analog switch 47 as well as all of the other analog switches 48–54 are open. There is no current flow through any of the resistors 55–62 and hence there is no current flow through the resistor 71. Thus during a further rise in the input voltage to the upper limit line 90, the output voltage is equal to the input voltage.

The output voltage line 88 has a slight upward curvature in going from each point to the next point and the output voltage is not an exactly linear function of conductivity. However, the magnitude of error is quite small and the accuracy is more than sufficient for most purposes. If greater accuracy is required, the number of stages in the linearizing circuit may be increased.

The foregoing description of the operation is accurate but may suggest that the design and adjustment of the circuit would be very difficult, complicated and time-consuming. It is found, however, that the circuit can be readily and accurately designed and adjusted by using a procedure which is based in part upon on analysis which involves working backwards from an assumption that the input voltage is initially at its upper limit 90. In going from point 100 on the upper limit line 90 to point 109 on the highest reference voltage level line 91 none of the analog switches 47–54 is closed and hence none of the adjustable resistors 55–62 enter into the operation. Accordingly, at least the reference voltage level 91 may be adjusted as a first step and generally, it is desirable to adjust all of the reference voltage levels. In this connection, it is found that both points 100 and 109 are on the output line 88, as well as on the input line 87, and since the output line 88 should be substantially linear, a straight line through points 100 and 109 should extend through the other points 118–124 at the intersections between lines 102–108 and reference voltage lines 92–98. The lines 101–108 should be spaced in accordance with the degree of change of slope of the non-linear input line, being more closely spaced when the slope change is great and being spaced further apart when there is a very small change in the slope. When the change in slope is about uniform, as in the illustration of FIG. 2, the lines should be approximately equally spaced. Since output line 88 is linear, the slope is initially calculated from known measured voltage levels 90 and 91 corresponding to points 100 and 109. The remaining reference voltage levels 92 through 98 are then calculated for each of the points on the abscissa 102 through 108. The required reference voltage levels are therefore easily determined by computation and the potentiometers 17–24 may be adjusted accordingly.

The next step is to adjust the resistor 55 to obtain the proper output voltage from point 109 to the next lower point 118 on the output line 88. To do so, resistor 55 is adjusted to obtain an output voltage equal to the reference voltage level of the second stage, indicated by lines 92, when the input voltage corresponds to the value represented by point 110 on the input line 87.

Then after adjustment of resistor 55, the next step is to adjust resistor 56 to obtain an output voltage equal to the reference voltage level of the third stage indicated by line 93 when the input voltage corresponds to the value represented by point 111. Then resistors 57–61 are adjusted in sequence to obtain output voltages as indicated by lines 94–98 when the input voltage corresponds to the values represented by points 112–116. Resistor 62 in the final stage is adjusted to obtain an output voltage equal to that represented by point 125 when the input voltage is at the lowest point 99, point 125 being in line with points 100, 109 and 118–124 on the output line 88 and being in vertical alignment with the point 99.

With this procedure, the linearizing circuit 11 may be quickly and accurately adjusted. It is noted that although the adjustment operation has been described in terms of the graphical representation of FIG. 2, it is not necessary to construct a graph. Also, for any particular type of instrument, the general form of the non-linear voltage to be linearized is known and conductivities or other values such as represented by the lower and upper limits and lines 101–108 may be established. For example, in a conductivity measuring instrument as described, measurements may be made on standard samples to establish numerical values corresponding to points 99, 100 and 109–116 from which the reference voltage values may be readily determined to permit adjustment of the potentiometers 17–24. After such adjustment, either using such standard samples or using an adjustable calibrated voltage source, the resistors 55–62 may be adjusted in sequence.

The adjustment procedure is not limited to instruments in which the change in slope is uniform and in some situations, the reference voltage values may be adjusted step-by-step instead of or in addition ot adjustment of the resistors and accurate results may be obtained as long as the steps of the procedure are performed in the proper sequence.

In addition to the features and adjustments of the linearizing circuit 11, other features and adjustments are provided for minimizing errors and increasing the degree of accuracy of the measurements. The DC amplifier 13 includes an adjustable resistor 127 which forms a "Low" adjustment control and which is connected in series with a fixed resistor 128 across a capacitor 129 and between a minus input of an operational amplifier 130 and the output thereof which forms the output of the circuit, the plus input of the amplifier being the input of the circuit 13. The minus input of the amplifier 130 is connected through a resistor 131 to the output of an operational amplifier 132 having a plus input connected to the movable contact of a potentiometer 134 which is connected through resistors 135 and 136 to ground and to the positive power supply terminal 43.

An offset adjustment potentiometer 138 is connected to a negative power supply terminal 140 and is connected to the amplifier 130 in circuit with resistors 141 and 142 and capacitor 143.

The phase shifter circuit 84 includes a pair of adjustable resistors 145 and 146 which form "High" and "Coarse High" controls and which are connected in series with resistors 147 and 148 between the negative power supply terminal 140 and the positive power supply terminal 43. The junction between resistors 145 and 147 is connected to the minus terminal of an operational amplifier 150 having a plus input terminal connected to the line 76 on which a triangularly shaped signal is supplied from the oscillator circuit 74. The output of the amplifier 150 is coupled through four inverter circuits 151–154 to the angle detector circuit 83, a differentiating circuit formed by capacitor 155 and resistor 156 being connected between inverter circuits 152 and 153.

The "High" and "Coarse High" controls 145 and 146 control the point on the triangularly shaped wave form from the oscillator circuit at which the operational amplifier output changes state and thereby controls the delay of application of a reference pulse to the angle detector circuit 83. The controls 145 and 146 are set to produce a predetermined output voltage when a sample having a standard conductivity is measured.

The "Low" control 127 and the "High" and "Coarse High" controls 145 and 146 may be adjusted or checked by the operator from time to time during use of the instrument. The adjustable resistors of the linearizing circuit 11 and other adjustable controls such as potentiometer 134 and 138 in the DC amplifier need be adjusted only in initial calibration of the instrument, or in maintenance checks made periodically at relatively long time intervals.

It will be understood that modifications and variations may be made without departing from the spirit and scope of the novel concepts of the invention.

I claim as my invention:

1. In a non-destructive testing instrument including probe means for physical association with structure to be tested and probe circuit means associated with said probe means and operative to develop a DC voltage having a magnitude varying between first and second limits and having a non-linear relationship to units of measurement of a physical characteristic of the structure tested, a linearizing circuit comprising an input line and a reference ground line for connection to said probe circuit means for application of said DC voltage therebetween, an output line at which an output voltage of said linearizing circuit is produced, and a resistance connected between said input and output lines, at least first, second and third stages in said linearizing circuit respectively including first, second and third reference voltage sources each having a pair of terminals with one terminal of each reference voltage source being connected to said reference ground line, first, second and third adjustable resistances, and first, second and third connection means in series with said first, second and third adjustable resistances between the other terminals of said first, second and third reference voltage sources and said output line of said linearizing circuit, said first reference voltage source supplying a first reference voltage having a magnitude between said first and second limits and relatively close to said first limit, said second reference voltage source supplying a second reference voltage having a magnitude between that of said first reference voltage and said second limit, and said third reference voltage source supplying a third reference voltage having a magnitude between that of said second reference voltage and said second limit, said first connection means being operative for connecting said first adjustable resistance between the said other output terminal of said first reference voltage source and said output line when the magnitude of said linearizing circuit output voltage is between the magnitude of said first reference voltage and said second limit, said second connection means being operative for connecting said second adjustable resistance between the said other output terminal of said second reference voltage source and said output line when the magnitude of said output voltage is between the magnitude of said second reference voltage and said second limit, and said third connection means being operative for connecting said third adjustable resistance between the said other output terminal of said third reference voltage source and said output line when the magnitude of said output voltage is between the magnitude of said third reference voltage and said second limit.

2. In a non-destructive testing instrument as defined in claim 1, said first, second and third connection means respectively comprising first, second and third analog switches in series with said first, second and third adjustable resistance between said other output terminals of said first, second and third reference voltage sources and said output line, first, second and third switch-control operational amplifiers having inputs respectively connected to said other output terminals of said first, second and third reference voltage sources, said first, second and third operational amplifiers having additional inputs connected to said output line and having outputs respectively connected to said first, second and third analog switches.

3. In a non-destructive testing instrument as defined in claim 2, said first, second and third reference voltage sources respectively comprising first, second and third regulated voltage sources, first, second and third adjustable potentiometers respectively connected to said first, second and third regulated voltage sources, and first, second and third reference voltage supplying operational amplifiers having inputs respectively connected to said first, second and third adjustable potentiometers and having outputs respectively connected through said first, second and third analog switches and said first, second and third adjustable resistance means to said output line.

4. In a non-destructive testing instrument as defined in claim 1, said instrument being an eddy current instrument wherein said probe means includes test coil means and wherein said circuit means comprises an AC signal source coupled to said test coil means and detector means arranged to develop said DC voltage as a single-valued function of conductivity wherein the ratio of a change in said DC voltage to the corresponding change in conductivity decreases in proportion to an increase in conductivity.

5. In a method of obtaining a linearized output voltage in a non-destructive testing instrument including probe means for physical association with structure to be tested and probe circuit means associated with said probe means and operative to develop a DC voltage varying between first and second limits and having a non-linear relationship to units of measurement of a physical characteristic of the structure tested, the steps of providing a linearizing circuit including an input line and reference ground line for connection to said probe circuit means for application of said DC voltage therebetween, an output line at which an output voltage of said linearizing circuit is produced, and a resistance connected between said input and output lines, with said linearizing circuit including at least first, second and third stages including first, second and third reference voltage sources each having a pair of terminals with one terminal of each reference voltage source being connected to said reference ground line, first, second and third connection means in series between the other terminals of said first, second and third reference voltage sources and said output line of said linearizing circuit, adjusting the first reference voltage for defining a constant factor of proportionality between said linearizing circuit output voltage and the measured physical characteristic and for establishing therefrom the input voltage which corresponds to any given linearizing circuit output voltage, then adjusting the first adjustable resistance and the second reference voltage in relationship to each other to produce a linearizing circuit output voltage equal to the second reference voltage when an input voltage corresponding to the second reference voltage is applied, then adjusting the second adjustable resistance and the third reference voltage in relation to each other to produce a linearizing circuit output voltage equal to the third reference voltage when an input voltage corresponding to the third reference voltage applied, and then adjusting the third adjustable resistance for substantially obtaining said constant factor of proportionality with an applied input voltage and the value between said second limit and the value effected to produce a linearizing circuit output voltage equal to said third reference voltage.

* * * * *